O. PRINCE.
CAR FENDER.
APPLICATION FILED APR. 15, 1911.
1,021,702.
Patented Mar. 26, 1912.
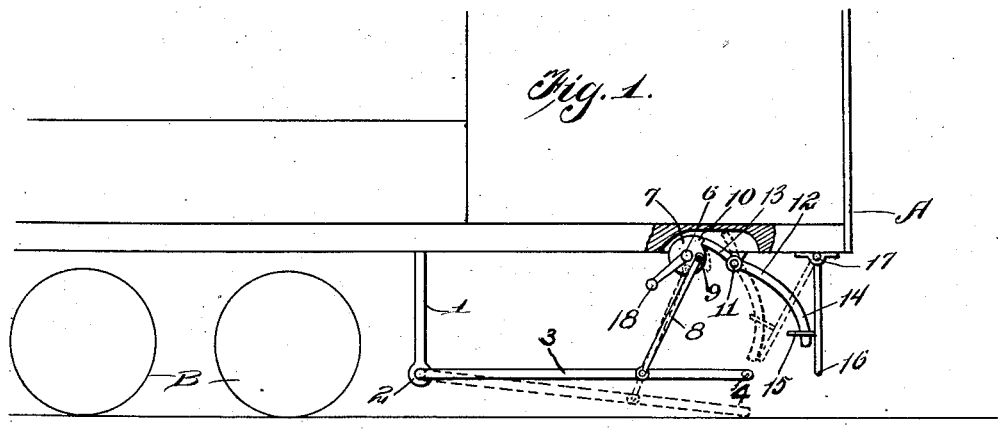
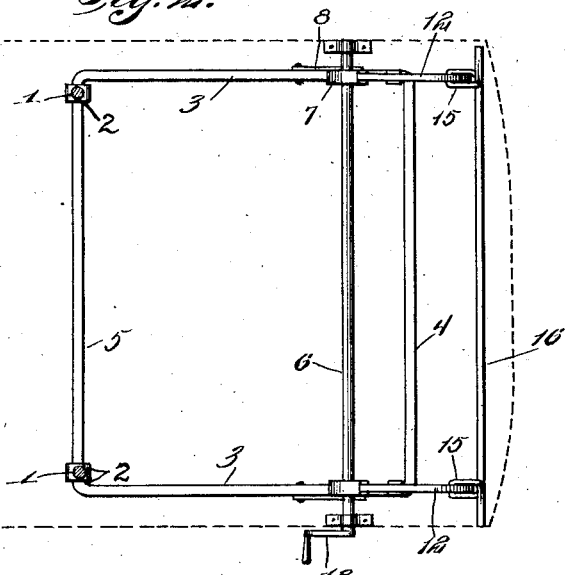
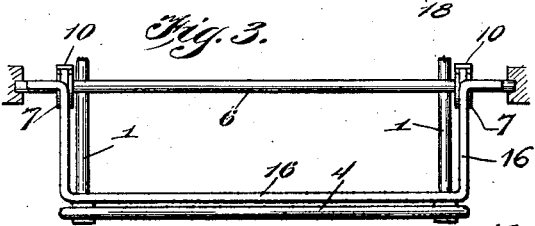
Inventor
Otho Prince
Witnesses
Louis R. Heinrichs
R. B. Cavanagh
By Victor J. Evans
Attorney

UNITED STATES PATENT OFFICE.

OTHO PRINCE, OF CAMBRIDGE, OHIO.

CAR-FENDER.

1,021,702.  Specification of Letters Patent.  Patented Mar. 26, 1912.

Application filed April 15, 1911. Serial No. 621,294.

*To all whom it may concern:*

Be it known that I, OTHO PRINCE, a citizen of the United States, residing at Cambridge, in the county of Guernsey and State of Ohio, have invented new and useful Improvements in Car-Fenders, of which the following is a specification.

The present invention relates to certain novel and useful improvements in car fenders, and has particular application to the fender adapted to be mounted beneath the platform of a street railway car, in front of and adjacent to the front truck.

In the present instance, it is my purpose to provide a simple and inexpensive form of fender, which may be readily applied to any well known make of car and which will be positive in the performance of its functions.

It is further my purpose to provide a fender, which is automatic in its operation, that is to say, one which when the fender comes into contact with an obstruction or body upon the track will automatically drop into a protective position without any action upon the part of the motorman. This is a distinct advantage inasmuch as it obviates the necessity of the motorman's attention being diverted from the performance of other acts, such as applying the car brakes, and the cutting off of the current.

Still another object of my invention is to provide a fender which will embody in its construction the desired features of durability, economy, positiveness and efficiency in operation.

With the above recited objects and others of a similar nature in view, my invention consists in the construction, combination and arrangement of parts set forth in and falling within the scope of the appended claims.

In the accompanying drawings—Figure 1 is a view in side elevation of a portion of a car equipped with my improved fender, the fender being shown in its tripped position in dotted lines. Fig. 2 is a plan view of the fender with the platform of the car body removed and showing the application of the fender to the frame of the car. Fig. 3 is a front view of the fender.

Referring now to the accompanying drawings in detail, the letter A designates conventionally the forward portion of the car, including the front platform, beneath which my improved fender is designed to be mounted, while the numeral B indicates the front car truck.

Depending from the under side of the frame of the car are the rods 1—1, one at each side of the car, said rods being rigidly fastened to the sills of the frame in any preferred manner. Pivotally connected to the lower ends of said rods 1, as at 2, are the longitudinally extending bars 3, connected at their forward ends through the medium of the cross bar 4, while the numeral 5 designates a rear cross bar extending between the pivot points 2—2, the construction and arrangement just described being such that a pivoted frame is formed by the bars 3, 4 and 5.

The numeral 6 designates a cross shaft journaled in the sills of the car, and upon which shaft I mount at opposite ends thereof, the cam wheels 7, which are keyed to the shaft 6 in any suitable and preferred manner. These wheels are connected to the longitudinal bars 3 through the medium of the vertically inclined rods 8, the end of each of the latter being connected eccentrically to the corresponding cam wheel as at 9. Carried by each wheel 7 is a cam member 10, while pivoted at 11 to the sills of the platform are the tripping members 12, one arm portion 13 of each of which is adapted to bear against one of the cam wheels, while the opposite end 14 of each tripping member 12 is adapted to extend through a guide staple 15, formed on the swinging gate 16, pivotally supported as at 17, forward of the fender frame and beneath the front of the platform. It will of course be understood that there are two tripping members, one for each cam wheel and that these tripping members are designed to be simultaneously actuated by the movement of the swinging gate. If desired, a crank arm 18 may be connected to the shaft 6 for the purpose of raising the fender after it has dropped.

From the above description, taken in connection with the accompanying drawings, the construction and operation of my improved fender will be readily apparent.

In its normal position, the fender frame is held as is shown in full lines in Fig. 1, that is to say with the top arm 13 abutting against the cam member 10, with the fender frame held clear and free of the track, the swinging gate beneath the front platform being in an approximately vertical position. Should an obstruction be encountered or be struck by the swinging gate, the latter will be forced rearwardly on its pivot 17, striking the lower ends of the arms 14 of the tripping members 12, thereby moving the latter upon their fulcrums 11 and throwing the trip arm portions 13 out of contact with the cam wheels. The weight of the fender frame will consequently turn the cam wheels and the frame will drop to the track to the position shown in dotted lines in Fig. 1, thereby preventing the obstruction from encountering the front truck of the car.

It will be seen that I have provided a fender which may be readily and quickly applied to any type of car, and while I have herein shown and described one particular embodiment of my invention, I wish it to be understood that I do not confine myself to all the precise details herein set forth, as modifications and variations may be made without departing from the spirit of the invention or exceeding the scope of the appended claims.

What I claim is:—

1. The combination with a car, of rigid members depending from the car beneath the platform thereof, a fender frame pivoted to said members, cam wheels rotatably mounted on the car, a connection between each of the cam wheels and the pivoted frame, a swinging gate pivoted beneath the platform of the car forward of the fender frame, and tripping members mounted beneath the platform of the car between the gate and the cam wheels, each tripping member being adapted to engage with a shoulder of the adjacent cam wheel at one end, and with the swinging gate at the opposite end, said swinging gate in its movement inward releasing the members from engagement with the cam wheels to effect the tripping of the fender.

2. The combination with a car, of a fender frame pivoted thereto, a shaft journaled in the frame of the car, cam wheels mounted upon said shaft, connections between said cam wheels and the pivoted frame, tripping members for said cam wheels, each comprising a plurality of arms, one of said arms being adapted to abut against its corresponding cam wheel and the other of said arms extending downward across the front of the pivoted frame, and a swinging member at the front of the car adapted to effect the tripping of the fender.

3. The combination with a car, of a pivoted fender frame located beneath the platform thereof, a shaft journaled in the sills of the car, a plurality of cam wheels carried by said shaft, rods connecting said cam wheels with the pivoted fender frame, trips for said cam wheels, each of said trips comprising a pivotally supported member having two arms, one of said arms engaging with the adjacent cam wheel, while the other of said arms extends downward and across the front of the pivoted fender, and a swinging gate adapted to contact with the latter arm for tripping the same to drop the fender.

In testimony whereof I affix my signature in presence of two witnesses.

OTHO PRINCE.

Witnesses:
  S. Oblinger,
  Edgar Prince.

---

Copies of this patent may be obtained for five cents each, by addressing the "Commissioner of Patents Washington, D. C."